(12) United States Patent
Katsuki et al.

(10) Patent No.: US 11,066,118 B2
(45) Date of Patent: Jul. 20, 2021

(54) BICYCLE SEATPOST SYSTEM

(71) Applicant: Shimano Inc., Osaka (JP)

(72) Inventors: Takuya Katsuki, Osaka (JP); Yasuhiro Tsuchizawa, Osaka (JP); Kenji Kamada, Osaka (JP); Tomohiro Kondo, Osaka (JP)

(73) Assignee: Shimano Inc., Osaka (JP)

(*) Notice: Subject to any disclaimer, the term of this patent is extended or adjusted under 35 U.S.C. 154(b) by 471 days.

(21) Appl. No.: 15/880,974

(22) Filed: Jan. 26, 2018

(65) Prior Publication Data
US 2019/0233040 A1 Aug. 1, 2019

(51) Int. Cl.
| | | |
|---|---|---|
| *B62J 1/08* | (2006.01) | |
| *B62J 99/00* | (2020.01) | |
| *B62J 45/20* | (2020.01) | |
| *B62J 45/40* | (2020.01) | |
| *B62J 45/415* | (2020.01) | |

(52) U.S. Cl.
CPC ............ *B62J 1/08* (2013.01); *B62J 99/00* (2013.01); *B62J 45/20* (2020.02); *B62J 45/40* (2020.02); *B62J 45/4151* (2020.02); *B62J 2001/085* (2013.01)

(58) Field of Classification Search
CPC ........ B62J 1/08; B62J 99/00; B62J 2001/085; B62J 2099/0013; B62J 2099/002; B62J 1/06; B62K 2207/02; B62K 19/36; B62K 45/40; B62K 45/412; B62K 45/414; B62K 45/415; B62K 45/4151; B62K 45/4152
See application file for complete search history.

(56) References Cited

U.S. PATENT DOCUMENTS

| | | | |
|---|---|---|---|
| 9,422,018 B2 | 8/2016 | Pelot et al. | |
| 9,592,882 B2 | 3/2017 | Butora et al. | |
| 10,040,499 B2 * | 8/2018 | Hara | B62J 1/08 |
| 10,328,827 B2 * | 6/2019 | Knox | B60N 2/39 |
| 2012/0274043 A1 * | 11/2012 | Lee | B62K 19/36 |
| | | | 280/288.4 |
| 2015/0197308 A1 * | 7/2015 | Butora | B62J 1/06 |
| | | | 280/283 |
| 2016/0176463 A1 * | 6/2016 | McPherson | B62J 1/10 |
| | | | 297/215.15 |
| 2016/0304146 A1 | 10/2016 | Teixeira et al. | |
| 2016/0304157 A1 * | 10/2016 | Craven | B62M 6/50 |
| 2016/0368559 A1 * | 12/2016 | Voss | B62K 19/32 |
| 2018/0105222 A1 * | 4/2018 | Tepass | B62J 1/08 |
| 2018/0265059 A1 * | 9/2018 | D'Addetta | B60T 8/261 |
| 2018/0334212 A1 * | 11/2018 | Bowers | B62K 3/02 |
| 2019/0193800 A1 * | 6/2019 | Hara | B62J 1/10 |

FOREIGN PATENT DOCUMENTS

| | | | |
|---|---|---|---|
| AT | 517859 A1 | 5/2017 | |
| DE | 10 2015 204 880 A1 | 9/2016 | |
| EP | 2 476 605 A1 | 7/2012 | |

* cited by examiner

*Primary Examiner* — Dale Moyer
(74) *Attorney, Agent, or Firm* — Global IP Counselors, LLP

(57) ABSTRACT

A bicycle seatpost system is basically provided with a height adjustable seatpost and an electronic controller. The height adjustable seatpost includes an electric actuator. The electronic controller is configured to control the electric actuator to change a height of the height adjustable seatpost in accordance with detected information about a change of orientation of a bicycle relative to a ground.

21 Claims, 6 Drawing Sheets

BICYCLE SEATPOST SYSTEM

BACKGROUND

Field of the Invention

This invention generally relates to a bicycle seatpost system. More specifically, the present invention relates to a bicycle seatpost system that change a height of a height adjustable seatpost based on a change in a riding condition of a bicycle.

Background Information

A bicycle seat is normally supported on a bicycle frame by a seatpost that is telescopically disposed in a seat tube of a bicycle frame. The height of the bicycle seat with respect to the bicycle frame is typically adjusted by changing an insertion amount of the seatpost in the seat tube of the bicycle frame. Recently, some bicycles are provided with a height adjustable seatpost in order to adjust a height of a bicycle seat while riding. The preferred seat height often changes based on the riding conditions. One example of a height adjustable seatpost is disclosed in U.S. Pat. No. 9,592,882 to Butora et al.

SUMMARY

Generally, the present disclosure is directed to various features of a bicycle seatpost system that change a height of a height adjustable seatpost in accordance with detected information about a change of orientation (e.g., a cornering orientation or a jumping orientation) of a bicycle relative to a ground.

In view of the state of the known technology and in accordance with a first aspect of the present disclosure, a bicycle seatpost system is provided that basically comprises a height adjustable seatpost and an electronic controller. The height adjustable seatpost includes an electric actuator. The electronic controller is configured to control the electric actuator to change a height of the height adjustable seatpost in accordance with detected information about a change of orientation of a bicycle relative to a ground.

With the bicycle seatpost system according to the first aspect, it is possible to automatically change a height of a seatpost in accordance with a change of orientation of a bicycle relative to a ground on which the bicycle is traveling.

In accordance with a second aspect of the present invention, the bicycle seatpost system according to the first aspect is configured so that the detected information includes first information relating to a cornering orientation of the bicycle.

With the bicycle seatpost system according to the second aspect, it is possible to change a height of a seatpost to an appropriate height for traveling a corner.

In accordance with a third aspect of the present invention, the bicycle seatpost system according to the second aspect is configured so that the first information is determined by an inclination angle defined between a vertical plane and a reference upright plane of at least one of the bicycle and a rider.

With the bicycle seatpost system according to the third aspect, it is possible to determine a cornering state of the bicycle by using an inclination sensor to detect a lateral inclination angle of the bicycle or the rider.

In accordance with a fourth aspect of the present invention, the bicycle seatpost system according to the third aspect is configured so that the first information is determined by comparing the inclination angle and a reference angle.

With the bicycle seatpost system according to the fourth aspect, it is possible to determine a cornering state of the bicycle by using an inclination sensor to detect a lateral inclination angle of the bicycle or the rider.

In accordance with a fifth aspect of the present invention, a bicycle seatpost system is provided that basically comprises a height adjustable seatpost and an electronic controller. The height adjustable seatpost includes an electric actuator. The electronic controller is configured to control the electric actuator to change a height of the height adjustable seatpost by comparing a reference angle and an inclination angle of at least one of a bicycle and a rider. The inclination angle is defined between a vertical plane and a reference upright plane of the at least one of the bicycle and the rider.

With the bicycle seatpost system according to the fifth aspect, it is possible to accurately judge a cornering orientation.

In accordance with a sixth aspect of the present invention, the bicycle seatpost system according to the fourth or fifth aspect is configured so that the electronic controller is further configured to change the reference angle in accordance with a forward velocity of the bicycle.

With the bicycle seatpost system according to the sixth aspect, it is possible to accurately judge a cornering orientation.

In accordance with a seventh aspect of the present invention, the bicycle seatpost system according to the fifth or sixth aspect is configured so that the reference angle increases as the detected velocity increases.

With the bicycle seatpost system according to the seventh aspect, it is possible to accurately judge a cornering orientation.

In accordance with an eighth aspect of the present invention, the bicycle seatpost system according to any one of the fourth to seventh aspects is configured so that the electronic controller is further configured to change the reference angle in accordance with a user input to set the reference angle.

With the bicycle seatpost system according to the eighth aspect, it is possible to judge a cornering state according to user demand.

In accordance with a ninth aspect of the present invention, the bicycle seatpost system according to any one of the fourth to eighth aspects is configured so that the electronic controller is further configured to change the height of the height adjustable seatpost to be a first height that is lower than a maximum height of the height adjustable seatpost upon determining the inclination angle is larger than or equal to the reference angle.

With the bicycle seatpost system according to the ninth aspect, it is possible to lower center of gravity during traveling a corner for stable cornering.

In accordance with a tenth aspect of the present invention, the bicycle seatpost system according to the ninth aspect is configured so that the electronic controller is further configured to change the height of the height adjustable seatpost from the first height to a second height that is higher than the first height upon determining the inclination angle has becomes less than the reference angle after changing of the height of the height adjustable seatpost from the second height to the first height.

With the bicycle seatpost system according to the tenth aspect, it is possible to automatically return a height of a seatpost to an original height that existed before cornering orientation occurred.

In accordance with an eleventh aspect of the present invention, the bicycle seatpost system according to any one of the fourth to tenth aspects is configured so that the electronic controller is further configured to not change the height of the height adjustable seatpost in accordance with the detected information upon determining the inclination angle is less than the reference angle.

With the bicycle seatpost system according to the eleventh aspect, it is possible to accurately judge a cornering orientation. Therefore, it is possible to avoid unnecessary change of height.

In accordance with a twelfth aspect of the present invention, the bicycle seatpost system according to any one of the second to eleventh aspects is configured so that the electronic controller is further configured to not change the height of the height adjustable seatpost in accordance with the detected information based on rotational information of a crank of the bicycle.

With the bicycle seatpost system according to the twelfth aspect, it is possible to avoid interfering with the pedaling of the bicycle by the rider even during a cornering orientation.

In accordance with a thirteenth aspect of the present invention, the bicycle seatpost system according to the twelfth aspect is configured so that the electronic controller is further configured to not change the height of the height adjustable seatpost in accordance with the detected information upon determining the crank is rotated faster than a predetermined rotational speed.

With the bicycle seatpost system according to the thirteenth aspect, it is possible to avoid interfering with the pedaling of the bicycle by the rider even during a cornering orientation.

In accordance with a fourteenth aspect of the present invention, the bicycle seatpost system according to any one of the first to thirteenth aspects is configured so that the detected information includes second information relating to a jumping state of the bicycle.

With the bicycle seatpost system according to the fourteenth aspect, it is possible to change a height of a seatpost to an appropriate height for jumping.

In accordance with a fifteenth aspect of the present invention, the bicycle seatpost system according to the fourteenth aspect is configured so that the second information is determined by detecting a vertical acceleration of the bicycle.

With the bicycle seatpost system according to the fifteenth aspect, it is possible to determine a jumping orientation by using a vertical acceleration sensor.

In accordance with a sixteenth aspect of the present invention, the bicycle seatpost system according to the fifteenth aspect is configured so that the second information is determined by detecting an increasing ratio of a vertical acceleration of the bicycle being larger than or equal to a reference increasing ratio.

With the bicycle seatpost system according to the sixteenth aspect, it is possible to determine a stating moment of jumping.

In accordance with a seventeenth aspect of the present invention, the bicycle seatpost system according to the fifteenth or sixteenth aspect is configured so that the second information is determined by detecting that a decreasing ratio of a vertical acceleration of the bicycle being larger than or equal to a reference decreasing ratio.

With the bicycle seatpost system according to the seventeenth aspect, it is possible to determine a starting point of dropping.

In accordance with an eighteenth aspect of the present invention, the bicycle seatpost system according to any one of the fifteenth to seventeenth aspects is configured so that the second information is determined by continuously detecting a vertical acceleration that is less than a reference vertical acceleration for a predetermined period.

With the bicycle seatpost system according to the eighteenth aspect, it is possible to determine a floating state after jumping.

In accordance with a nineteenth aspect of the present invention, the bicycle seatpost system according to any one of the fifteenth to eighteenth aspects is configured so that the electronic controller is further configured to control the seat height to be a first height that is lower than a maximum height in accordance with the second information.

With the bicycle seatpost system according to the nineteenth aspect, it is possible to avoid interference between a rider and a saddle in a jumping orientation.

In accordance with a twentieth aspect of the present invention, the bicycle seatpost system according to the nineteenth aspect is configured so that the detected information includes third information relating to a landing state of the bicycle, and the electronic controller is further configured to control the seat height to be a second height higher than the first height in accordance with the third information.

With the bicycle seatpost system according to the twentieth aspect, it is possible to automatically return a height of a seatpost to an original height that existed before jumping occurred.

In accordance with a twenty-first aspect of the present invention, the bicycle seatpost system according to the nineteenth or twentieth aspect is configured so that the third information is determined by detecting pulsation of a vertical acceleration of at least one of the bicycle and a rider with a reference amplitude.

With the bicycle seatpost system according to the twenty-first aspect, it is possible to accurately judge a landing orientation.

In accordance with a twenty-second aspect of the present invention, a bicycle seatpost system is provided that basically comprises a height adjustable seatpost and an electronic controller. The height adjustable seatpost includes an electric actuator. The electronic controller is configured to control the electric actuator to change a height of the height adjustable seatpost in accordance with a detected vertical acceleration of the bicycle. The electronic controller changes the height of the height adjustable seatpost upon determining an increasing ratio of the vertical acceleration is larger than or equal to a reference increasing ratio, a decreasing ratio of a vertical acceleration of the bicycle is larger than or equal to a reference decreasing ratio, or the vertical acceleration is less than a reference vertical acceleration for a predetermined period.

With the bicycle seatpost system according to the twenty-second aspect, it is possible to change a height of a seatpost to an appropriate height for jumping.

In accordance with a twenty-third aspect of the present invention, the bicycle seatpost system according to any one of the first to twenty-second aspects is configured so that the electronic controller is further configured to control the height of the height adjustable seatpost to be a first height that is shorter than a second height in accordance with the detected information.

With the bicycle seatpost system according to the twenty-third aspect, it is possible to lower a height of a seatpost to an appropriate height that is suitable for a change of orientation.

In accordance with a twenty-fourth aspect of the present invention, the bicycle seatpost system according to the twenty-third aspect is configured so that the electronic controller is further configured to set the first height as a minimum height in an adjustable height range of the height adjustable seatpost.

With the bicycle seatpost system according to the twenty-fourth aspect, it is possible to lower a height of a seatpost to an appropriate height that is suitable for a change of orientation.

In accordance with a twenty-fifth aspect of the present invention, the bicycle seatpost system according to the twenty-third aspect is configured so that the electronic controller is further configured to set the second height to be a height existing just before changing the height of the height adjustable seatpost to the first height.

With the bicycle seatpost system according to the twenty-fifth aspect, it is possible to automatically return a height of a seatpost to an original height before a change of an orientation of the bicycle.

Also, other objects, features, aspects and advantages of the disclosed bicycle seatpost system will become apparent to those skilled in the art from the following detailed description, which, taken in conjunction with the annexed drawings, discloses one embodiment of the bicycle seatpost system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
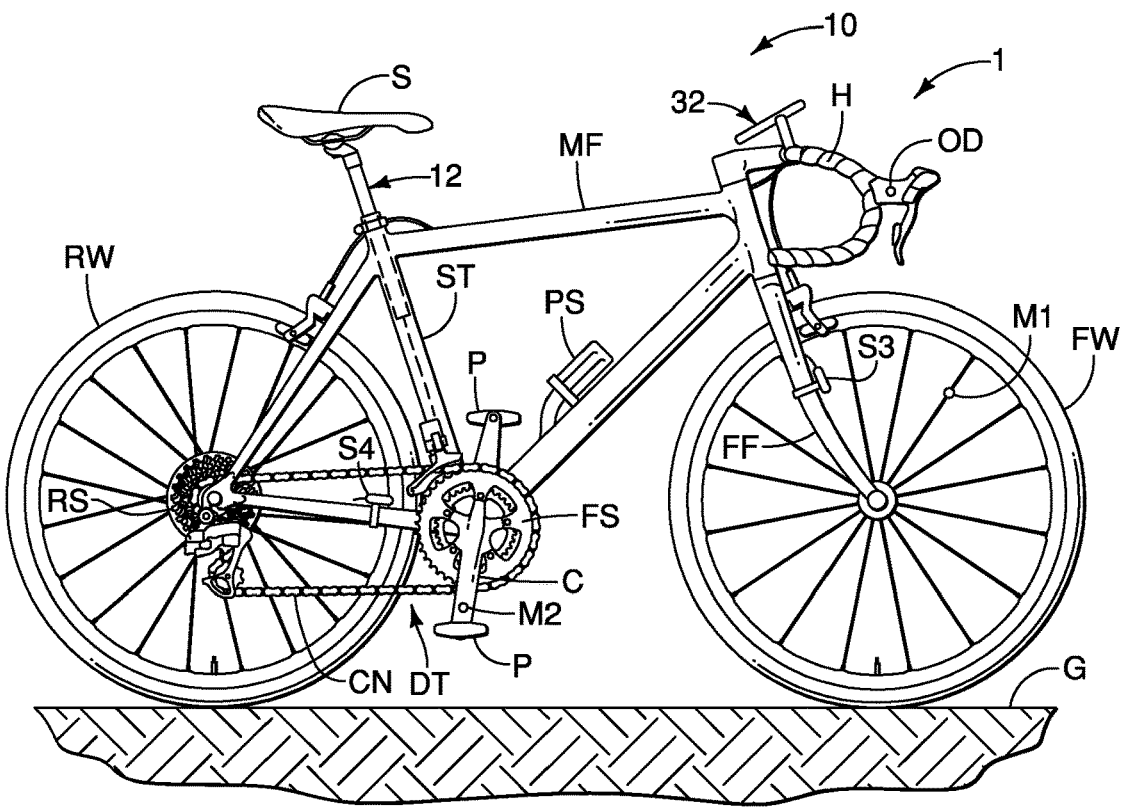
FIG. 1 is a side elevational view of a bicycle that is equipped with a bicycle seatpost system in accordance with one illustrated embodiment.

Referring initially to FIG. 1, a bicycle 1 is illustrated that is equipped with a bicycle seatpost system 10 in accordance with a first embodiment. While the bicycle 1 is illustrated as a road bike, the bicycle seatpost system 10 can be used with other styles of bicycles. In the illustrated embodiment of FIG. 1, the bicycle 1 includes, among other things, a handlebar H, a main bicycle frame MF, a front fork FF, a bicycle seat S, a front wheel FW, a rear wheel RW and a drive train DT. The drive train DT is configured to convert the rider's pedaling force into driving force. The drive train DT includes, among other things, a crank C, a pair of pedals P, a pair of front sprockets FS, a plurality of rear sprockets RS and a chain CN. Since these bicycle components are well known bicycle components, these bicycle components will not be discussed herein except to the extent need to understand the bicycle seatpost system 10.

Figure 2:
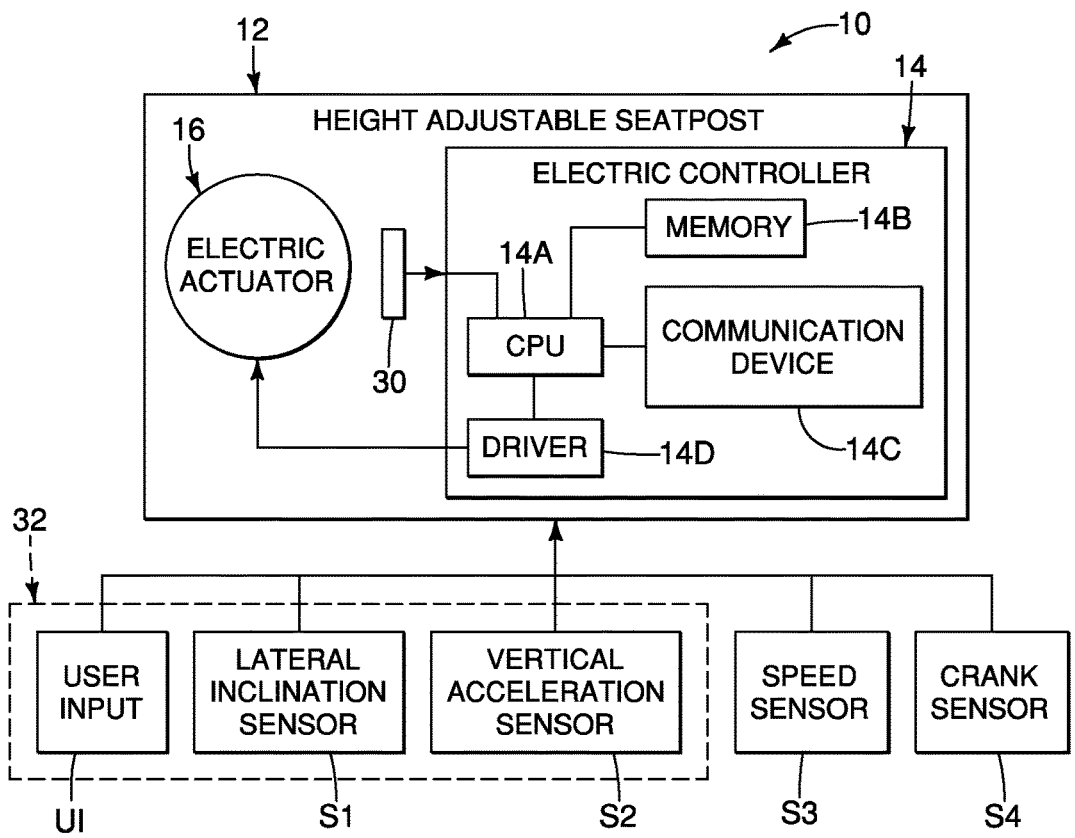
FIG. 2 is a schematic block diagram for the bicycle seatpost system of the bicycle illustrated in FIG. 1.

As seen in FIG. 2, the bicycle seatpost system 10 comprises a height adjustable seatpost 12 and an electronic controller 14. In the illustrated embodiment, the electronic controller 14 is integrated with the height adjustable seatpost 12. However, it will be apparent that the electronic controller 14 can be either a separate part that is attached to the height adjustable seatpost 12, or a remotely located part that is electrically or wirelessly connected to the height adjustable seatpost 12. As explained below, the electronic controller 14 changes a height of the height adjustable seatpost 12 in accordance with detected information about a change of orientation (e.g., a cornering orientation or a jumping orientation) of the bicycle 1 relative to a ground G that the bicycle 1 is traveling over.

As seen in FIG. 2, the height adjustable seatpost 12 includes an electric actuator 16. The electronic controller 14 is configured to control the electric actuator 16 to change a height of the height adjustable seatpost 12 in accordance with detected information about a change of orientation of the bicycle 1 relative to the ground G. As explained below, the detected information includes first information relating to a cornering orientation of the bicycle 1. For example, in the illustrated embodiment, the first information is a detected rolling or inclination angle θ. Also, the detected information includes second information relating to a jumping state of the bicycle 1. For example, in the illustrated embodiment, the second information is a detected rapidly decrease in vertical gravitational acceleration that is less than or equal to a predetermined value. Moreover, the detected information includes third information relating to a landing state of the bicycle 1. For example, in the illustrated embodiment, the third information is a detected pulsation of a vertical acceleration of at least one of the bicycle 1 and the rider R having at least a predetermined reference amplitude. While the electronic controller 14 is configured to control the electric actuator 16 to change the height of the height adjustable seatpost 12 based a cornering orientation, a jumping state and a landing state, the electronic controller 14 can be configured to just control the height of the height adjustable seatpost 12 based on just either a cornering orientation or a jumping state.

Figure 3:
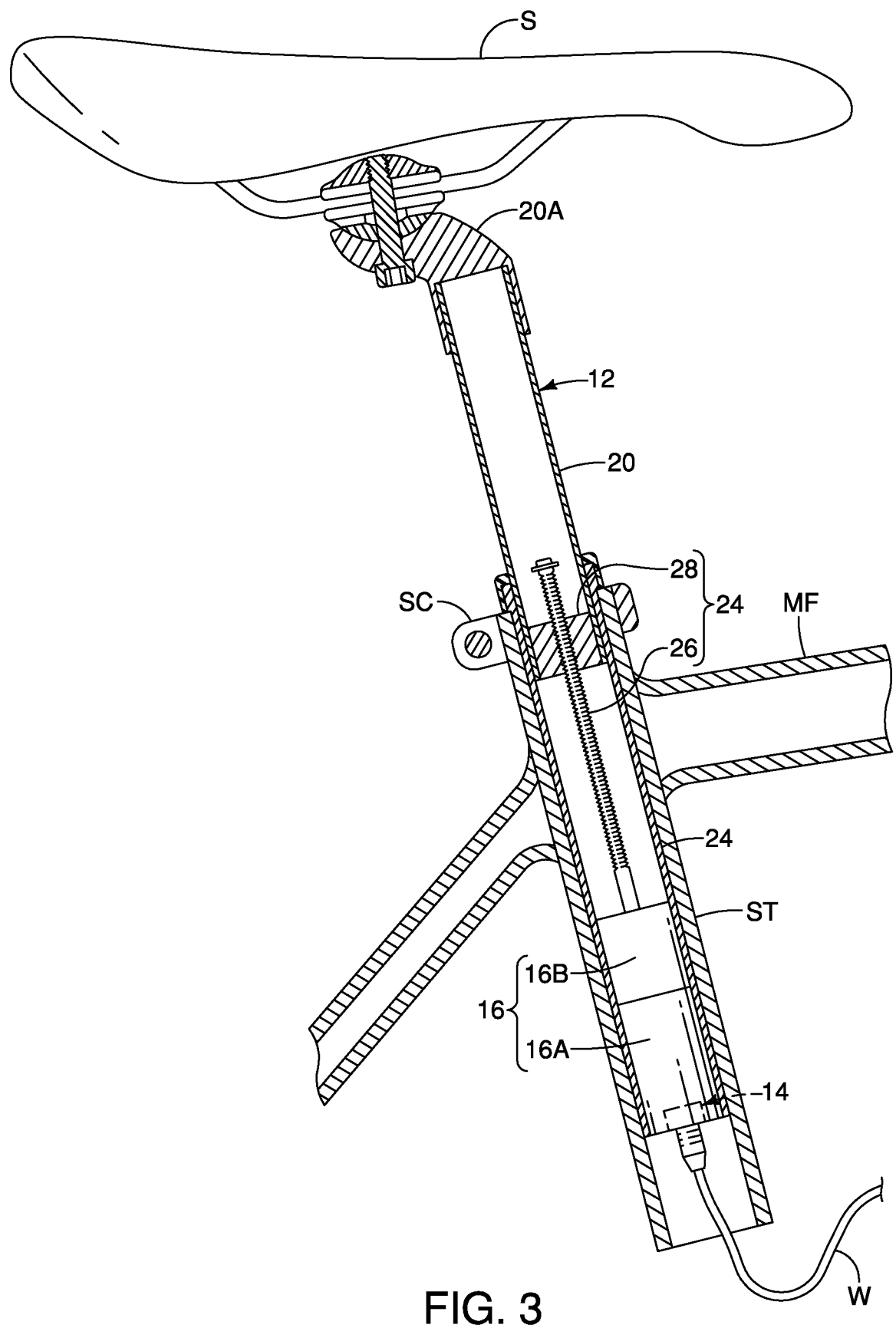
FIG. 3 is an enlarged longitudinal cross-sectional view of a portion of the bicycle illustrated in FIG. 1 that is equipped with a height adjustable seatpost of the bicycle seatpost system.
Figure 4:
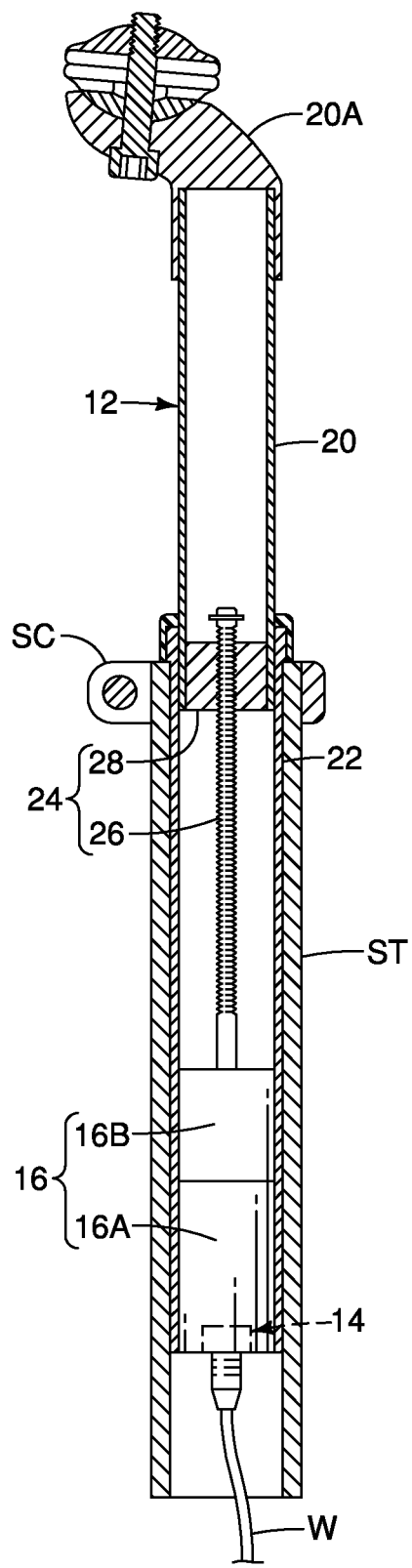
FIG. 4 is a longitudinal cross-sectional view of the height adjustable seatpost in a high or maximum height position.
Figure 5:
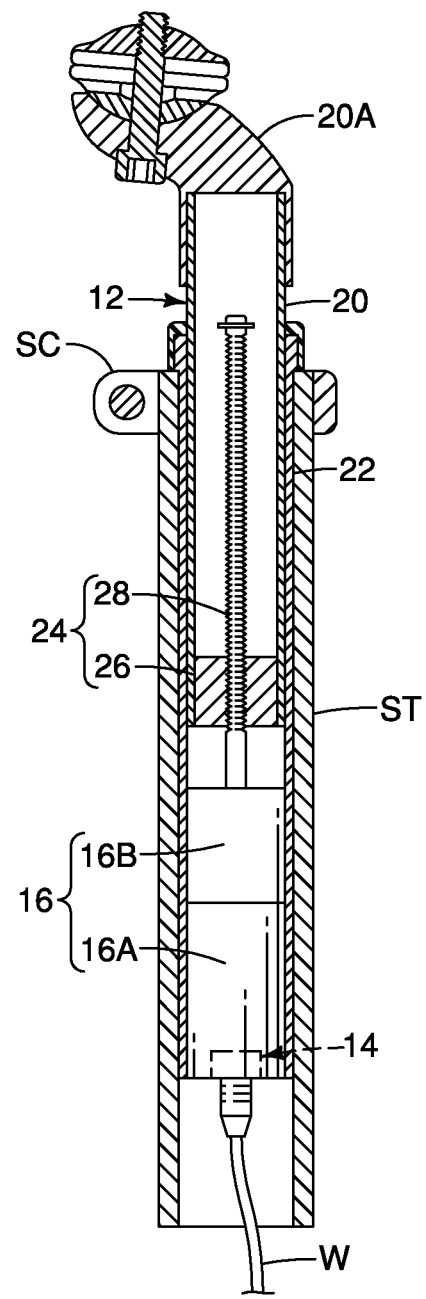
FIG. 5 is a longitudinal cross-sectional view of the height adjustable seatpost in a low or minimum height position.

As seen in FIGS. 3 to 5, in the illustrated embodiment, the height adjustable seatpost 12 is a motorized seatpost for automatically or manually adjusting a seat height of the bicycle seat S with respect to the main bicycle frame MF. In addition to the electric actuator 16, the height adjustable seatpost 12 further includes an inner (first) tube 20, an outer (second) tube 22 and a height adjustment device 24. In general, the inner and outer tubes 20 and 22 are telescopically arranged, with the amount of insertion of the inner tube 20 into the outer tube 22 being adjustable. Thus, the inner and outer tubes 20 and 22 concentrically arranged as seen in the illustrated embodiment as seen in FIG. 3.

In the illustrated embodiment, the inner and outer tubes 20 and 22 are a separate unit from the main bicycle frame MF such that the outer tube 22 is easily installed into a seat tube ST of the main bicycle frame MF as seen in FIG. 3. The inner tube 20 has a seat clamp 20A on its upper end for attaching the seat S in a conventional manner. The outer tube 22 is secured to the seat tube ST of the main bicycle frame MF by a conventional clamping arrangement C that is provided on the upper end of the seat tube ST. The height adjustment device 24 operatively connects the inner and outer tubes 20 and 22 together for selectively extending (raising) and retracting (lowering) the inner tube 20 with respect to the outer tube 22 based on a motor control signal from the electronic controller 14. The height adjustment device 24 can be controlled by the rider to raise and lower the height of the seat S to any desired height. The electronic controller 14 can also include a plurality of pre-set heights that the rider can select. Here, as explained below, the electronic controller 14 is configured to receive wireless control signals. Therefore, for example, an operating switch of an operating device OD (see FIG. 1) can be operated by a rider which then sends a wireless control signal to the electronic controller 14 for raising or lowering the height of the seat S to a desired height. Alternatively, an operating switch or lever can be provided on the height adjustable seatpost 12 for the rider to raise and lower the height of the seat S to a desired height.

In the illustrated embodiment, the height adjustment device 24 mainly includes a drive screw 26 and a screw nut 28 that form a linear movement mechanism. The screw nut 28 is threadedly engaged with the drive screw 26 such that the screw nut 28 moves in an axial direction of the drive screw 26 in response to relative rotational movement between the drive screw 26 and the screw nut 28. Of course, other types of linear movement mechanisms can be used as needed and/or desired. In other words, the height adjustment device 24 of the height adjustable seatpost 12 is not limited to the illustrated structure.

As seen in FIG. 3, the electric actuator 16 basically includes a motor 16A and a gear reduction unit 16B. In this illustrated embodiment, the motor 16A is a reversible electric motor that is rigidly secured to the lower end of the outer tube 22. Reversible electric motors such as the motor 16A, are well known, and thus, the motor 16A will not be discussed and/or illustrated in detail. The gear reduction unit 16B reduces the rotational speed of the motor 16A while maintaining a constant output torque. In this way, the gear reduction unit 16B includes a plurality of gears arranged to transfer the rotation of the motor 16A to the drive screw 26 at a lower speed and a higher torque. Gear reduction units, such as the gear reduction unit 16B, are well known, and thus, the gear reduction unit 16B will not be discussed and/or illustrated in detail.

In the illustrated embodiment, as seen in FIG. 1, the bicycle 1 includes a power supply PS for supplying electrical power to the motor 16A of the electric actuator 16. In particular, the power supply PS is electrically connected to the motor 16A by an electrical wire W. The power supply PS is mounted to the main bicycle frame MF in the illustrated embodiment. The power supply PS preferably includes one or more rechargeable battery cells. Alternatively, the power supply PS can be a fuel cell, or any other suitable source of electrical power. The power supply PS can be a dedicated power supply for the height adjustable seatpost 12, or can be shared with other electrical bicycle components. If the power supply PS can be a dedicated power supply for the height adjustable seatpost 12, then the power supply PS can be built into the height adjustable seatpost 12.

In the illustrated embodiment, as seen in FIG. 2, the height adjustable seatpost 12 further includes a position sensor 30 to detect a height of the height adjustable seatpost 12. The position sensor 30 is an electro-mechanical device that converts the angular position of a shaft, axle, gear or other rotating part of the motor 16A or the gear reduction unit 16B to an analog or digital position signal that is sent to the electronic controller 14. The position sensor 30 is, for example, a rotary encoder that detects a rotation amount of an output shaft of the motor 16A or a rotation amount of a gear of the gear reduction unit 16B. Using feedback control based on the position signal from the position sensor 30, the electronic controller 14 sends an operating signal to the motor 16A for controlling the operation (rotation) of the motor 16A to output a desired amount rotational movement to the height adjustment device 24 via the gear reduction unit 16B. In this way, the electronic controller 14 can operate the height adjustment device 24 to obtain the desired seat position of the seat S.

As seen in FIG. 2, the electronic controller 14 includes an arithmetic processing unit 14A that executes predetermined control programs for the height adjustment device 24. The arithmetic processing unit 14A includes, for example, a central processing unit (CPU) as shown, or a micro processing unit (MPU). Thus, the arithmetic processing unit 14A of the electronic controller 14 includes at least one processor that is preferably disposed on a printed circuit board. The electronic controller 14 typically further includes a general circuit such as an input interface circuit or an output interface circuit. The electronic controller 14 can include two or more arithmetic processing units if needed and/or desired. The electronic controller 14 further includes memory 14B that stores information used for various kinds of control programs and various kinds of control processes of the height adjustment device 24. The memory 14B includes, for example, a nonvolatile memory and a volatile memory and can includes a ROM (Read Only Memory) device, a RAM (Random Access Memory) device, a hard disk, a flash drive, etc. The memory 14B is any computer storage device or any computer readable medium with the sole exception of a transitory, propagating signal. The electronic controller 14 further includes a communication device 14C that is configured to communicate with other devices of the bicycle seatpost system 10. The communication device 14C can include a power line communication (PLC) unit and a wireless communicator. Examples of wireless communication methods for the communication device 14C include BLUETOOTH® and ANT+®. The electronic controller 14 further includes a motor driver 14D for controlling the motor 16A to output a desired amount rotational movement to the height adjustment device 24 via the gear reduction unit 16B.

Preferably, the bicycle seatpost system 10 further comprises a user interface or user input UI, a lateral inclination sensor S1, a vertical acceleration sensor S2, a speed sensor S3 and a crank angle sensor S4. Here, in the illustrated embodiment, the user input 20, the lateral inclination sensor S1 and the vertical acceleration sensor S2 are part of a mobile device 32 or a cyclocomputer (not shown). For example, as shown in FIG. 1, the mobile device 32 is a "smart" mobile cellular telephone that can be mounted on the bicycle 1. Alternatively, the user input 20, the lateral inclination sensor S1 and the vertical acceleration sensor S2 can each be a separate device that is mounted on either the bicycle 1 or the height adjustable seatpost 12. In the case of the mobile device 32, the user input UI can be a touch screen or input buttons. The mobile device 32 is provided with communication software to wirelessly communicate with the electronic controller 14 of the height adjustable seatpost 12. Thus, the mobile device 32 can wirelessly transmit user commands, a lateral inclination of the bicycle 1 and a vertical acceleration of the bicycle 1. The mobile device 32 can also be used to notify a rider R with a sound notification, a vibration notification or a display notification when the height of the height adjustable seatpost 12 is being adjusted for cornering or jumping. Alternatively, this height adjustment notification of the height adjustable seatpost 12 can be provided by a cyclocomputer or other devices.

Typically, a "smart" mobile cellular telephone is provided with an accelerometer and a gyroscope. In the case of "smart" mobile cellular telephone as the mobile device 32, the lateral inclination sensor S1 and the vertical acceleration sensor S2 can be formed by the accelerometer and gyroscope of the mobile device 32. Since lateral inclination sensors and vertical acceleration sensors are known sensors, the lateral inclination sensor S1 and the vertical acceleration sensor S2 will not be discussed and/or illustrated herein.

The detected information from the lateral inclination sensor S1 includes the first information relating to a cornering orientation of the bicycle 1. Basically, a cornering orientation is determined by detecting an inclination of the bicycle 1 in a rolling direction (i.e., a rolling or inclination angle θ) with the lateral inclination sensor S1. Cornering is determined to exist when the rolling or inclination angle θ by the lateral inclination sensor S1 is detected to be larger than or equal to a predetermined reference angle α. Cornering is determined to be completed when the rolling or inclination angle θ is detected by the lateral inclination sensor S1 to be smaller than the predetermined reference angle α. Preferably, the threshold value of the rolling or inclination angle θ that is used for the cornering determination is adjusted in accordance with a forward velocity of the bicycle 1.

The range of operational rolling or inclination angle θ while cornering can be calculated by the following Formula:

$$\mathrm{Tan}\,\theta = \frac{mg}{mv^2/r}$$

where
m: mass (kg)
g: gravitational acceleration (m/s$^2$)
r: curve radius (m)
v: velocity (m/s)

Figure 6:
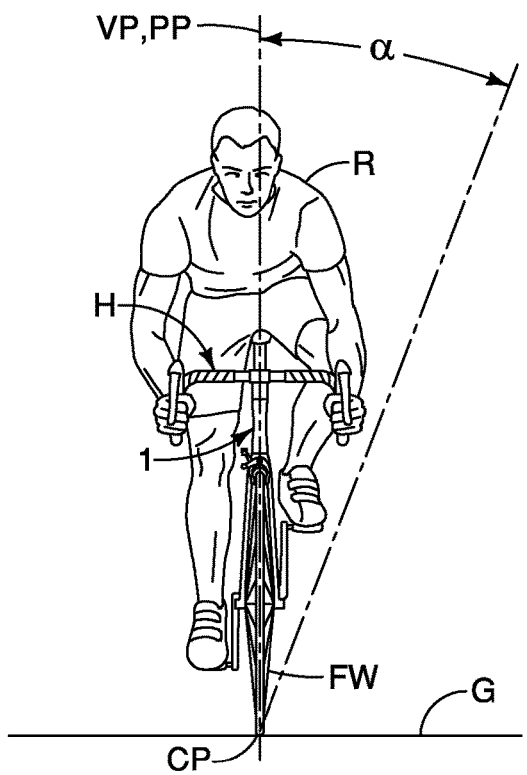
FIG. 6 is a front elevational view of the bicycle illustrated in FIG. 1 with the bicycle and the rider in an upright orientation in which a center of gravity of the rider lies in a vertical plane extending from a ground contact point of the bicycle wheels.
Figure 7:
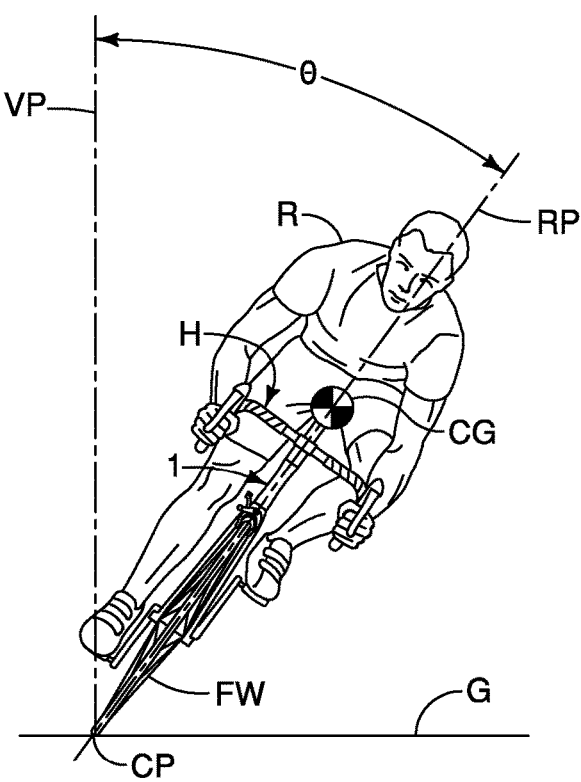
FIG. 7 is a front elevational view of the bicycle illustrated in FIGS. 1 and 6 in a cornering orientation in which a center of gravity of the rider lies along a reference upright plane of the bicycle.

For example, the rolling angle or inclination angle θ of the bicycle 1 is approximately 9° when the bicycle 1 is a traveling at 10 km/hr on a corner of a road with a 5 meter curve radius. Therefore, a threshold value (i.e., the reference angle α) can be set to 9° for the bicycle 1 traveling at 10 km/hr on a corner of a road with a 5 meter curve radius. However, preferably, the threshold value is adjusted in accordance with a coefficient of friction of the road surface. In other words, the reaction to the horizontal centripetal force is preferably considered. More specifically, the horizontal centrifugal force (mv$^2$/r) is preferably kept below the reaction to the horizontal centripetal force (μ mg) to maintain the stability of the bicycle 1. Thus, in the illustrated embodiment, the threshold value (i.e., the reference angle α) is adjust, as needed so that the following inequality is satisfied:

$$mv^2/r < \mu mg.$$

where
m: mass (kg)
g: gravitational acceleration (m/s$^2$)
r: curve radius (m)
v: velocity (m/s)
μ: coefficient of friction Referring to FIGS. 6 and 7, the first information is determined by an inclination angle θ that is defined between a vertical plane VP and a reference upright plane RP of at least one of the bicycle 1 and a rider R. As explained below, the electronic controller 14 is configured to control the electric actuator 16 to change a height of the height adjustable seatpost 12 by comparing the reference angle α and the inclination angle θ of at least one of a bicycle 1 and a rider. The reference angle α is prestored in advance in the memory of the electronic controller 14. As mentioned above, the electronic controller 14 is further configured to change the reference angle α in accordance with a forward velocity of the bicycle 1. The electronic controller 14 is programmed such that the reference angle α increases as the detected velocity increases.

The reference angle α can be selectively set by the rider R using the user input UI of the mobile device 32. The electronic controller 14 can have a factory default setting for the reference angle α in the case the rider does not set a preferred reference angle α that can be based on the parameter (e.g., weight, size, etc.) of the bicycle 1 and/or the parameter (e.g., weight, size, etc.) of the rider. Thus, preferably, the electronic controller 14 is further configured to change the reference angle α in accordance with a user input to set the reference angle α.

In FIGS. 6 and 7, the reference upright plane RP is illustrated as corresponding to a center upright plane of the main bicycle frame MF of the bicycle 1. In other words, in FIGS. 6 and 7, the reference upright plane RP corresponds to a center longitudinal plane of the bicycle 1 that bisects main bicycle frame MF in a fore to aft direction of travel and passes through a ground contact point CP of the front wheel FW or the rear wheel RW. To facilitate the detection of the inclination angle θ, the mobile device 32 is mounted on the handlebar stem so that the lateral inclination sensor S1 and the vertical acceleration sensor S2 lie substantially on the center longitudinal plane (i.e., the reference upright plane RP) of the bicycle 1.

Figure 8:
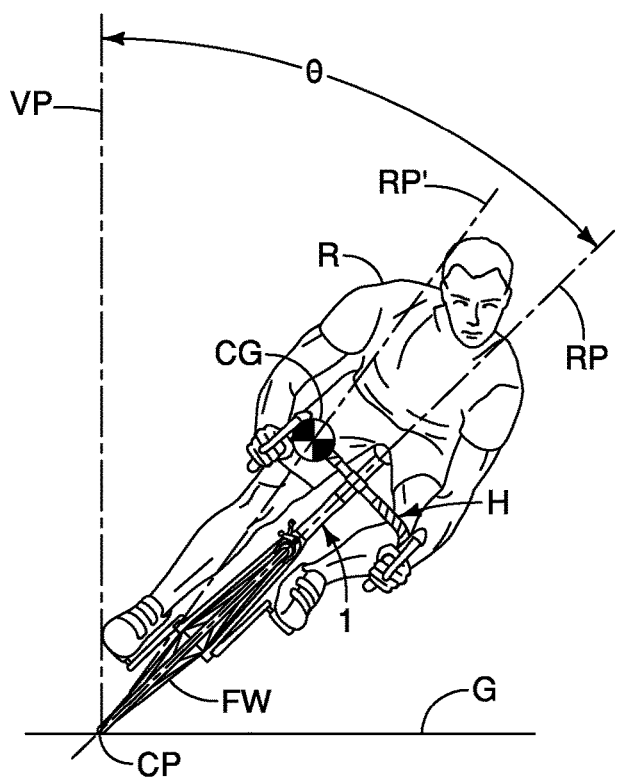
FIG. 8 is a front elevational view of the bicycle illustrated in FIGS. 1, 6 and 7 in a cornering orientation in which a center of gravity of the rider is offset from the reference upright plane of the bicycle.
Figure 9:
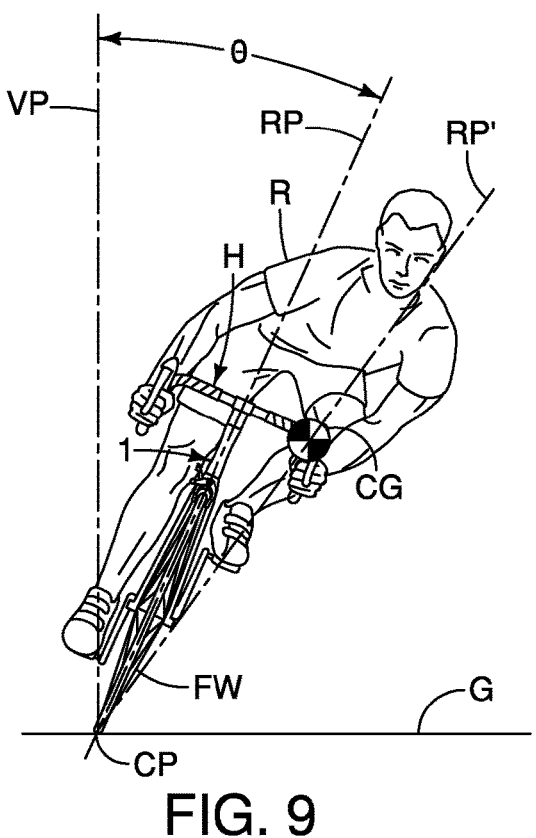
FIG. 9 is a front elevational view of the bicycle illustrated in FIGS. 1 and 6 to 8 in a cornering orientation in which a center of gravity of the rider is offset from the reference upright plane of the bicycle.

Alternatively, as seen in FIGS. 8 and 9, a reference upright plane RP' can be based on both the bicycle 1 and the rider R such that the reference upright plane RP' corresponds to a plane that passes through a center of gravity CG of both the bicycle 1 and the rider R and passes through the ground contact point CP of the front wheel FW or the rear wheel RW. Alternatively, the reference upright plane can be based on solely a center plane of the rider R in which the reference upright plane can be based on both the bicycle 1 and the rider R such that the reference upright plane corresponds to a plane that bisects a torso region of the rider R and passes through the ground contact point CP of the front wheel FW or the rear wheel RW.

The detected information from the vertical acceleration sensor S2 includes the second information relating to the jumping. As used herein, the term "jumping state" refers to an upward propelling situation in which the bicycle 1 moves in an upward direction with respect to the ground G, as well as falling situation in which the bicycle 1 leaves the ground and starts falling downward towards the ground G (i.e., the jumping state is a floating state from the ground G).

Figure 10:
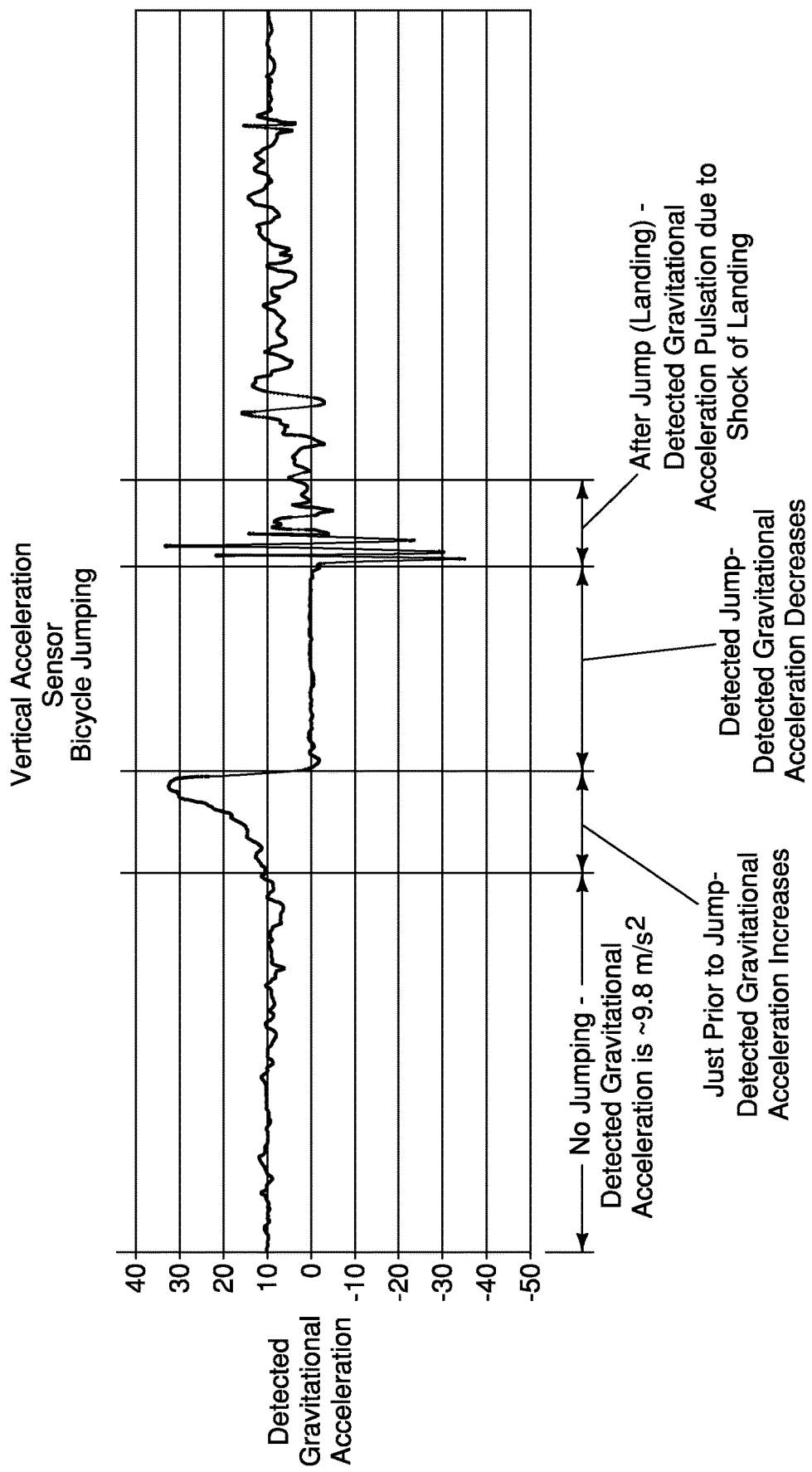
FIG. 10 is a graph of experimental data showing a detected gravitational acceleration of a bicycle from a vertical acceleration sensor as the bicycle travels along the ground and performs a jump.

As seen in FIG. 10, experimental data from the vertical acceleration sensor S2 has been plotted on a graph to show a detected gravitational (vertical) acceleration of the bicycle 1 as the bicycle 1 travels along the ground and performs a jump. The jumping state is determined by detecting a pulsation condition of the bicycle 1 from the variation of the vertical acceleration of the bicycle 1 with the vertical acceleration sensor S2. Basically, a start of a jumping state is determined by detecting when the vertical acceleration rapidly decreases and becomes less than or equal to a predetermined value (e.g., less than 1.0 m/s$^2$). In other words, detecting the change in the vertical acceleration when the bicycle 1 is off the ground. An end or completion of a jumping state is determined by detecting when the vertical acceleration rapidly changes and becomes larger than or equal to the predetermined value (e.g., larger than 9.8 m/s$^2$). In other words, detecting the change in the vertical acceleration when the bicycle 1 has landed after being in the air.

Here, in FIG. 1, the speed sensor S3 and the crank angle sensor S4 wireless communicate with the communication device 14C of the electronic controller 14. Alternatively, the speed sensor S3 can be connected by one or more wires to the communication device 14C of the electronic controller 14 to transmit a signal that is indicative of the forward velocity of the bicycle 1. Likewise, the crank angle sensor S4 can be connected by one or more wires to the communication device 14C of the electronic controller 14 to transmit a signal that is indicative of the rider pedaling the bicycle 1.

The speed sensor S3 is mounted on the front fork FF, and is arranged to detect a magnet M1 that is mounted on a spoke of the front wheel FW. Thus, the speed sensor S3 senses each rotation of the front wheel FW as the magnet M1 passes the speed sensor S3. The speed sensor S3 can be a Hall Effect sensor or a reed switch that detects the magnetic field of the magnet M1. The speed sensor S3 is wirelessly connected to the electronic controller 14 but could be connected to the electronic controller 14 via an electrical wire. The crank angle sensor S4 is mounted on a chain stay of the main bicycle frame MF, and is arranged to detect a magnet M2 that is mounted on one of the crank arms of the crank C to detect a pedaling motion. Thus, the crank angle sensor S4 senses each rotation of the crank C as the magnet M2 passes the crank angle sensor S4. The crank angle sensor S4 can be a Hall Effect sensor or a reed switch that detects the magnetic field of the magnet M2. The crank angle sensor S4 is wirelessly connected to the electronic controller 14 but could be connected to the electronic controller 14 via an electrical wire.

Figure 11:
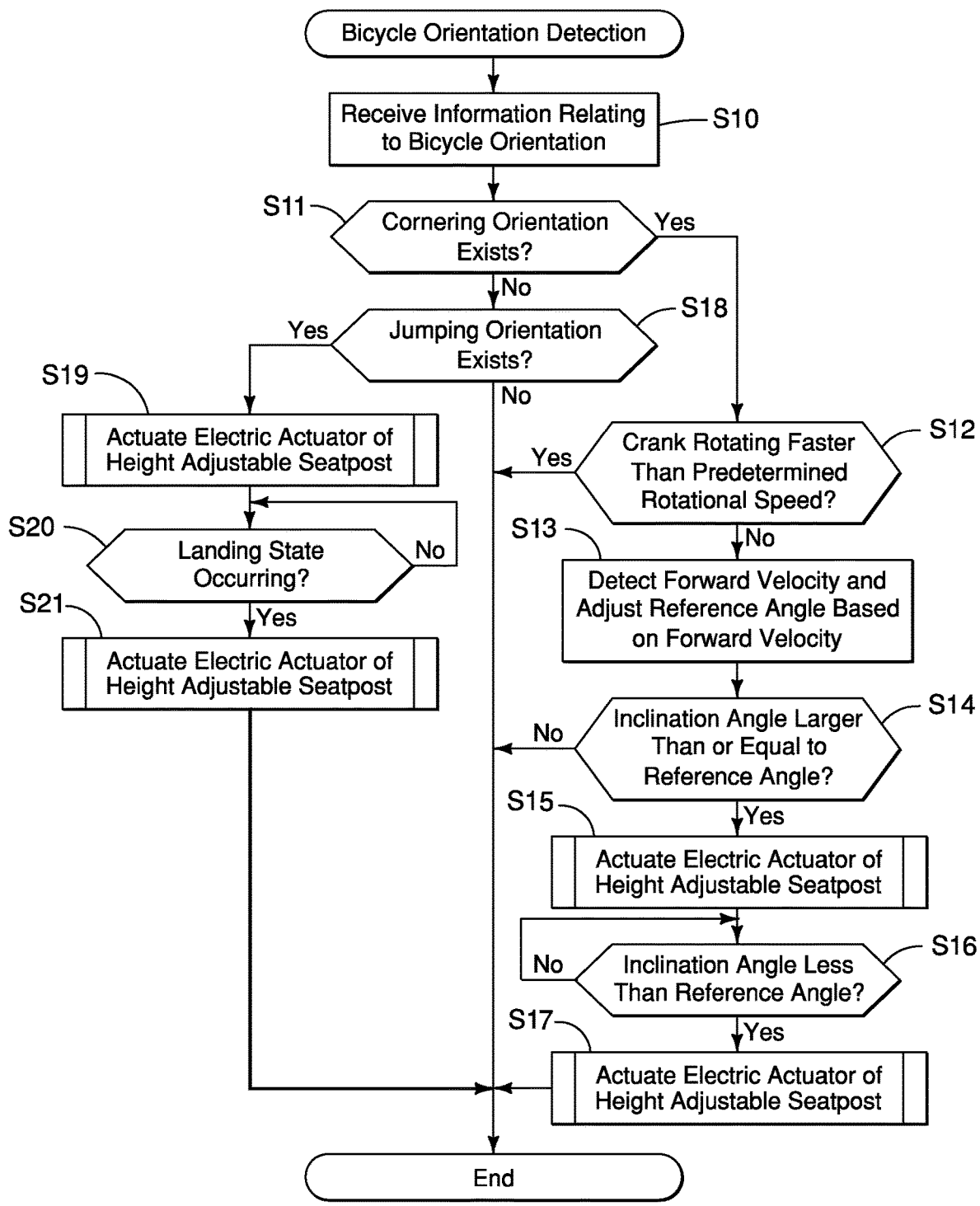
FIG. 11 is a flow chart of a bicycle seatpost control operation to change a height of the height adjustable seatpost based on a change in a riding condition of the bicycle that is executed by an electronic controller of the bicycle seatpost system illustrated in FIG. 2.

Referring now to FIG. 11, a flow chart illustrates a control program of a control process that is executed by the electronic controller 14. The control process is started upon receiving information indicative of a change in the orientation of the bicycle 1 relative to the ground G in which it is desirable to change the height of the seat S for the rider R by changing the height of the height adjustable seatpost 12. Preferably, the rider R can select whether the height of the seat S will be changed for a cornering state and/or a jumping state. In other words, using the user input UI of the mobile device 32, the rider R can selectively set between (1) a cornering only adjustment setting; (2) a jumping only adjustment setting; and (3) a cornering and jumping adjustment setting.

Basically, with the control process of FIG. 11, when cornering, the position of a height adjustable seatpost 12 is lowered to lower the center of gravity CG of the bicycle 1 and the rider R, and so that it will be easy for the rider R to touch the ground G with his foot. In this way, the stability of the bicycle 1 will be improved during cornering. However, with the control process of FIG. 11, the position of the height adjustable seatpost 12 is not changed while the crank C is rotating, even if the cornering orientation is determined. Similarly, with the control process of FIG. 11, when jumping, the position of a height adjustable seatpost 12 is lowered to a position that is not impeditive for the rider R to shift load when landing after jumping.

In step S1, the electronic controller 14 receives information from the sensors S1, S2, S3 and S4 relating to the orientation of the bicycle 1 relative to the ground G. The detected information from the lateral inclination sensor S1 includes the first information relating to a cornering orientation of the bicycle 1. The detected information from the vertical acceleration sensor S2 includes the second information relating to the jumping state of the bicycle 1 and the third information relating to a landing state of the bicycle 1. The detected information from the speed sensor S3 includes information relating to a forward velocity of the bicycle 1. The detected information from the crank angle sensor S4 includes information relating to a rotational state of the crank C of the bicycle 1. Upon receiving the information from the sensors S1, S2, S3 and S4, the control process proceeds to step S2 if either the cornering only adjustment setting or the cornering and jumping adjustment setting is selected. However, if the rider selects the jumping only adjustment setting, then the control process proceeds from step S1 directly to step S18.

In step S2, the electronic controller 14 determines if a cornering orientation exists based on the first information detected by the lateral inclination sensor S1. The first information is determined by comparing the inclination angle θ and the reference angle α. The electronic controller 14 changes the reference angle α in accordance with the forward velocity of the bicycle 1 detected by the speed sensor S3. The electronic controller 14 increases the reference angle α as the detected velocity increases. If the electronic controller 14 determines that a cornering orientation does not exists, then the control process proceeds to step S18 if the cornering and jumping adjustment setting is selected. However, if the cornering only adjustment setting is selected, then the control process ends. As a result, the electronic controller 14 is further configured to not change the height of the height adjustable seatpost 12 in accordance with the detected information upon determining the inclination angle θ is less than the reference angle α. On the other hand, if the electronic controller 14 determines that a cornering orientation exists, then the control process proceeds to step S12.

In step S18, the electronic controller 14 determines if a jumping orientation exists based on the second information detected by the vertical acceleration sensor S2. Step S18 and the control process for changing the seat height when the bicycle 1 is in a jumping state will be discussed below.

In step S12, the electronic controller 14 determines if the crank C is rotating faster than a predetermined rotational speed to indicate that the rider R is pedaling and thus lowering the seat height would be undesirable. The predetermined rotational speed is stored in the memory 14B and varies depending on the rider, the environment and the bicycle composition. Preferably, the electronic controller 14 has a default setting for the predetermined rotational speed and/or a plurality of user selectable settings for predetermined rotational speed setting. Alternatively, the electronic controller 14 can be programmed to set the predetermined rotational speed based on a riding speed history. If the electronic controller 14 determines that the crank C is rotating faster than the predetermined rotational speed, then the control process ends. As a result, the electronic controller 14 is further configured to not change the height of the height adjustable seatpost 12 in accordance with the detected information upon determining the crank C is rotated faster than a predetermined rotational speed. In other words, the electronic controller 14 is further configured to not change the height of the height adjustable seatpost 12 in accordance with the detected information based on rotational information of the crank C of the bicycle 1. On the other hand, if the electronic controller 14 determines that the crank C is not rotating faster than the predetermined rotational speed, then the control process proceeds to step S13.

In step S13, the electronic controller 14 detect the forward velocity of the bicycle 1 from the speed sensor S3 and adjusts the reference angle α based on the forward velocity using a prestored relationship (e.g., a table, a map, etc.) between forward velocity and the reference angle α. In other words, in step S13, the electronic controller 14 is further configured to change the reference angle α in accordance with a forward velocity of the bicycle 1. More particularly, in step S13, the electronic controller 14 is configured such that the reference angle α increases as the detected velocity increases. After adjusting the reference angle α based on the forward velocity of the bicycle 1, the control process then proceeds to step S14.

In step S14, after the reference angle α has been adjusted based on the forward velocity of the bicycle 1, the electronic controller 14 determines if the inclination angle θ is larger than or equal to the reference angle α. The electronic controller 14 is further configured to not change the height of the height adjustable seatpost 12 in accordance with the detected information upon determining the inclination angle θ is less than the reference angle α. In other words, if the inclination angle θ is less than the reference angle α, then the control process ends. On the other hand, if the electronic controller 14 determines that the inclination angle θ is larger than or equal to the reference angle α, then the control process proceeds to step S15.

In step S15, the electronic controller 14 is further configured to control the height of the height adjustable seatpost 12 to be a first height that is shorter than a second height in accordance with the detected information. In other words, the electronic controller 14 is further configured to change the height of the height adjustable seatpost 12 to be the first height that is lower than a maximum height of the height adjustable seatpost 12 upon determining the inclination angle θ is larger than or equal to the reference angle α. Thus, the electronic controller 14 outputs a control signal to the motor 16A of the electric actuator 16 to lower the height of the height adjustable seatpost 12, and thus, the electronic controller 14 lowers the seat height of the seat S. In the illustrated embodiment, as seen in FIG. 5, the electronic controller 14 is configured to set the first height as a minimum height in an adjustable height range of the height adjustable seatpost 12. After changing the height of the height adjustable seatpost 12 to be the first height, the control process then proceeds to step S16.

In step S16, the electronic controller 14 determines if the inclination angle θ is less than the reference angle α. In other words, the electronic controller 14 determines if cornering state is ending. If the inclination angle θ is not less than the reference angle α, then the electronic controller 14 continuously compares the inclination angle θ to the reference angle α until the inclination angle θ becomes less than the reference angle α. Once the inclination angle θ is less than the reference angle α, the control process then proceeds to step S17.

In step S17, the electronic controller 14 is further configured to change the height of the height adjustable seatpost 12 from the first height to a second height that is higher than the first height upon determining the inclination angle θ has becomes less than the reference angle α after changing of the height of the height adjustable seatpost 12 from the second height to the first height. Preferably, the electronic controller 14 is further configured to set the second height to be a height existing just before changing the height of the height adjustable seatpost 12 to the first height. Thus, prior to adjusting the height of the height adjustable seatpost 12 to the first height, the height of the height adjustable seatpost 12 existing just before changing the height of the height adjustable seatpost 12 to the first height is stored in the memory 14B. After the height of the height adjustable seatpost 12 is changed back to its original height prior to cornering, the control process then ends. Alternatively, the second height of the seat S can be a preset seat height that is stored in the memory 14B.

In the case that the cornering and jumping adjustment setting with no cornering orientation existing, or the jumping only adjustment setting is selected, the control process proceeds to step S18.

In step S18, the electronic controller 14 determines if a jumping orientation exists based on the second information detected by the vertical acceleration sensor S2. Step S18. The second information is determined by detecting a vertical acceleration of the bicycle 1. More particularly, in the illustrated embodiment, the second information is determined by detecting an increasing ratio of a vertical acceleration of the bicycle 1 being larger than or equal to a reference increasing ratio. Alternatively, in the illustrated embodiment, the second information is determined by detecting that a decreasing ratio of a vertical acceleration of the bicycle 1 being larger than or equal to a reference decreasing ratio Also Alternatively, in the illustrated embodiment, the second information is determined by continuously detecting a vertical acceleration that is less than a reference vertical acceleration for a predetermined period.

If the electronic controller 14 determines that a jumping orientation does not exists, then the control process ends. On the other hand, if the electronic controller 14 determines a jumping orientation exists in step S18, then the control process proceeds to step S10.

In step S10, the electronic controller 14 is configured to control the electric actuator 16 to change a height of the height adjustable seatpost 12 in accordance with a detected vertical acceleration of the bicycle 1. Preferably, the electronic controller 14 is further configured to control the seat height to be a first height that is lower than a maximum height in accordance with the second information. In other words, the electronic controller 14 changes the height of the height adjustable seatpost 12 upon determining an increasing ratio of the vertical acceleration is larger than or equal to a reference increasing ratio, a decreasing ratio of a vertical acceleration of the bicycle 1 is larger than or equal to a reference decreasing ratio, or the vertical acceleration is less than a reference vertical acceleration for a predetermined period. After changing the height of the height adjustable seatpost 12 to be the first height, the control process then proceeds to step S20.

In step S20, the electronic controller 14 determines if a landing state is occurring based on the third information detected by the vertical acceleration sensor S2. The third information is determined by detecting pulsation of a vertical acceleration of at least one of the bicycle 1 and the rider R with a reference amplitude. In other words, a landing state is determined to be occurring if the vertical acceleration sensor S2 detects pulsation of a vertical acceleration of at least one of the bicycle 1 and the rider R with a reference amplitude. The reference amplitude is stored in the memory 14B, and changes depending on the landing and the bicycle composition itself (e.g. with or without suspension can also change the amplitude). The reference amplitude will be set based on the bicycle composition itself (e.g. with or without suspension can also change the amplitude) and the landing of the bicycle. If the electronic controller 14 detects a vertical acceleration pulsation with the reference amplitude, then the control process proceeds to step S21. However, if the electronic controller 14 does not detects a vertical acceleration pulsation with the reference amplitude, then the electronic controller 14 continuously checks the third information detected by the vertical acceleration sensor S2 to determine the vertical acceleration is pulsating with a reference amplitude or greater than the reference amplitude.

In step S21, the electronic controller 14 is further configured to control the seat height to be a second height higher than the first height in accordance with the third information. In other words, the electronic controller 14 changes the height of the height adjustable seatpost 12 to the height of the height adjustable seatpost 12 existing just before changing the height of the height adjustable seatpost 12 to the first height is stored in the memory 14B. After changing the height of the height adjustable seatpost 12 to be the second height, the control process ends. Alternatively, the second height of the seat S can be a preset seat height that is stored in the memory 14B.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle seatpost system. Accordingly, these directional terms, as utilized to describe the bicycle seatpost system should be interpreted relative to a bicycle in an upright riding position on a horizontal surface and that is equipped with the bicycle seatpost system. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle seatpost system comprising:
 a height adjustable seatpost including an electric actuator; and
 an electronic controller including memory, the electronic controller being configured to control the electric actuator to change a height of the height adjustable seatpost to one or more predetermined heights that is pre-stored in the memory in accordance with detected information about a change of orientation of a bicycle relative to a ground, the detected information is determined by an inclination angle defined between a vertical plane and a reference upright plane of at least one of the bicycle and a rider, the vertical plane being a constant plane that extends perpendicular to the ground, the detected information includes first information relating to a cornering orientation of the bicycle, the first information is determined by comparing the inclination angle and a reference angle, the electronic controller is further configured to change the height of the height adjustable seatpost to be a first height that is lower than a maximum height of the height adjustable seatpost upon determining the inclination angle is larger than or equal to the reference angle.

2. The bicycle seatpost system according to claim 1, wherein
the electronic controller is further configured to change the height of the height adjustable seatpost from the first height to a second height that is higher than the first height upon determining the inclination angle has becomes less than the reference angle after changing of the height of the height adjustable seatpost from the second height to the first height.

3. The bicycle seatpost system according to claim 1, wherein
the electronic controller is further configured to not change the height of the height adjustable seatpost in accordance with the detected information upon determining the inclination angle is less than the reference angle.

4. The bicycle seatpost system according to claim 1, wherein
the electronic controller is further configured to control the height of the height adjustable seatpost to be a first height of the predetermined heights that is stored in the memory that is shorter than a second height of the predetermined heights that is stored in the memory in accordance with the detected information.

5. The bicycle seatpost system according to claim 4, wherein
the electronic controller is further configured to set the first height as a minimum height in an adjustable height range of the height adjustable seatpost.

6. The bicycle seatpost system according to claim 4, wherein
the electronic controller is further configured to set the second height to be a height existing just before changing the height of the height adjustable seatpost to the first height.

7. A bicycle seatpost system comprising:
a height adjustable seatpost including an electric actuator; and
an electronic controller including memory, the electronic controller being configured to control the electric actuator to change a height of the height adjustable seatpost to one or more predetermined heights that is pre-stored in the memory, the electronic controller changing the height only along a longitudinal direction of the seatpost by comparing a reference angle and an inclination angle of at least one of a bicycle and a rider, the inclination angle being defined between a vertical plane and a reference upright plane of the at least one of the bicycle and the rider, the controller being configured to change the reference angle in accordance with a forward velocity of the bicycle.

8. A bicycle seatpost system comprising:
a height adjustable seatpost including an electric actuator; and
an electronic controller configured to control the electric actuator to change a height of the height adjustable seatpost in accordance with detected information about a change of orientation of a bicycle relative to a ground, the detected information is determined by an inclination angle defined between a vertical plane and a reference upright plane of at least one of the bicycle and a rider, the vertical plane being a constant plane that extends perpendicular to the ground,
the detected information including first information relating to a cornering orientation of the bicycle, the first information being determined by comparing the inclination angle and a reference angle,
the electronic controller being further configured to change the reference angle in accordance with a forward velocity of the bicycle.

9. The bicycle seatpost system according to claim 8, wherein
the reference angle increases as the detected velocity increases.

10. A bicycle seatpost system comprising:
a height adjustable seatpost including an electric actuator; and
an electronic controller configured to control the electric actuator to change a height of the height adjustable seatpost in accordance with detected information about a change of orientation of a bicycle relative to a ground, the detected information is determined by an inclination angle defined between a vertical plane and a reference upright plane of at least one of the bicycle and a rider, the vertical plane being a constant plane that extends perpendicular to the ground,
the detected information including first information relating to a cornering orientation of the bicycle, the first information being determined by comparing the inclination angle and a reference angle,
the electronic controller being further configured to change the reference angle in accordance with a user input to set the reference angle.

11. A bicycle seatpost system comprising:
a height adjustable seatpost including an electric actuator; and
an electronic controller configured to control the electric actuator to change a height of the height adjustable seatpost in accordance with detected information about a change of orientation of a bicycle relative to a ground, the detected information is determined by an inclination angle defined between a vertical plane and a reference upright plane of at least one of the bicycle and a rider, the vertical plane being a constant plane that extends perpendicular to the ground, the detected information including first information relating to a cornering orientation of the bicycle,
the electronic controller is being further configured to not change the height of the height adjustable seatpost in accordance with the detected information based on rotational information of a crank of the bicycle.

12. The bicycle seatpost system according to claim 11, wherein
the electronic controller is further configured to not change the height of the height adjustable seatpost in accordance with the detected information upon determining the crank is rotated faster than a predetermined rotational speed.

13. The bicycle seatpost system comprising:
a height adjustable seatpost including an electric actuator; and
an electronic controller configured to control the electric actuator to change a height of the height adjustable seatpost in accordance with detected information about a change of orientation of a bicycle relative to a ground, the detected information is determined by an inclination angle defined between a vertical plane and a reference upright plane of at least one of the bicycle and a rider, the vertical pane being a constant plane that extends perpendicular to the ground,
the detected information including information relating to a jumping state of the bicycle.

14. The bicycle seatpost system according to claim 13, wherein
the information is considered second information that is determined by detecting a vertical acceleration of the bicycle.

15. The bicycle seatpost system according to claim 14, wherein
the second information is determined by detecting an increasing rate of a vertical acceleration of the bicycle being larger than or equal to a reference increasing rate.

16. The bicycle seatpost system according to claim 14, wherein
the second information is determined by detecting that a decreasing rate of a vertical acceleration of the bicycle being larger than or equal to a reference decreasing rate.

17. The bicycle seatpost system according to claim 14, wherein
the second information is determined by continuously detecting a vertical acceleration that is less than a reference vertical acceleration for a predetermined period.

18. The bicycle seatpost system according to claim 14, wherein
the electronic controller is further configured to control the seat height to be a first height that is lower than a maximum height in accordance with the second information.

19. The bicycle seatpost system according to claim 18, wherein
the detected information includes third information relating to a landing state of the bicycle, and
the electronic controller is further configured to control the seat height to be a second height higher than the first height in accordance with the third information.

20. The bicycle seatpost system according to claim 19, wherein
the third information is determined by detecting pulsation of a vertical acceleration of at least one of the bicycle and a rider with a reference amplitude.

21. A bicycle seatpost system comprising:
a height adjustable seatpost including an electric actuator; and
an electronic controller including memory, the electronic controller being configured to control the electric actuator to change a height of the height adjustable seatpost in accordance with a detected vertical acceleration of the bicycle, the electronic controller changing the height of the height adjustable seatpost to one or more predetermined heights that is pre-stored in the memory upon determining a positive acceleration of the vertical acceleration is larger than or equal to a reference increasing rate, a negative acceleration of a vertical acceleration of the bicycle is larger than or equal to a reference decreasing rate, or the vertical acceleration is less than a reference vertical acceleration for a predetermined period.

* * * * *